(12) United States Patent
Mulvaney et al.

(10) Patent No.: US 12,454,821 B2
(45) Date of Patent: *Oct. 28, 2025

(54) SYSTEMS AND METHODS FOR BACKFLOW MANAGEMENT

(71) Applicant: 900 Ethan Allen Hwy LLC, Ridgefield, CT (US)

(72) Inventors: Andrew Mulvaney, Ridgefield, CT (US); Joseph Mulvaney, Ridgefield, CT (US)

(73) Assignee: 900 Ethan Allen Hwy LLC, Ridgefield, CT (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/362,090

(22) Filed: Jul. 31, 2023

(65) Prior Publication Data

US 2023/0374768 A1    Nov. 23, 2023

Related U.S. Application Data

(63) Continuation of application No. PCT/US2022/014457, filed on Jan. 29, 2022.

(60) Provisional application No. 63/143,153, filed on Jan. 29, 2021.

(51) Int. Cl.
| | | |
|---|---|---|
| *F16K 37/00* | (2006.01) |
| *E03C 1/122* | (2006.01) |
| *E03F 5/10* | (2006.01) |
| *E03F 5/18* | (2006.01) |
| *E03F 7/04* | (2006.01) |

(52) U.S. Cl.
CPC .............. *E03F 7/04* (2013.01); *E03C 1/1222* (2013.01); *E03F 5/107* (2013.01); *E03F 5/18* (2013.01); *F16K 37/005* (2013.01)

(58) Field of Classification Search
CPC .... E03F 7/04; E03F 5/107; E03F 5/18; E03C 1/1222
See application file for complete search history.

(56) References Cited

U.S. PATENT DOCUMENTS

| | | |
|---|---|---|
| 4,392,128 A | 7/1983 | Young et al. |
| 4,546,346 A | 10/1985 | Wave et al. |
| 4,569,312 A | 2/1986 | Riddell et al. |
| 4,973,950 A | 11/1990 | Tourtillott |

(Continued)

FOREIGN PATENT DOCUMENTS

| | | |
|---|---|---|
| AU | 2011101115 | 8/2011 |
| CN | 106638928 | 5/2017 |

(Continued)

OTHER PUBLICATIONS

Website: "https://www.hwmglobal.com/waste-water/" Waste Water; Feb. 2, 2021; 5 pps.

(Continued)

*Primary Examiner* — P. Macade Nichols
(74) *Attorney, Agent, or Firm* — Rowan Tree Law Group, PLLC; Carson C.K. Fincham

(57) ABSTRACT

Systems, methods, and articles of manufacture for automatic backflow identification, detection, remediation, and/or management. In some embodiments, a backflow management device may comprise a threaded and electronically-enabled plug installed in a non-pressurized pipe system cleanout, branch, or stub.

18 Claims, 14 Drawing Sheets

(56) References Cited

U.S. PATENT DOCUMENTS

| | | | |
|---|---|---|---|
| 5,006,833 | A | 4/1991 | Marlowe et al. |
| 5,287,884 | A | 2/1994 | Cohen |
| 5,568,825 | A | 10/1996 | Faulk |
| 5,704,389 | A | 1/1998 | Bouzaglou |
| 6,317,051 | B1 | 11/2001 | Cohen |
| 6,443,091 | B1 | 9/2002 | Matte |
| 8,066,029 | B2 | 11/2011 | McDonald et al. |
| 9,123,230 | B2 | 9/2015 | Rogers |
| 9,157,227 | B2 | 10/2015 | Savaria |
| 9,725,894 | B2 | 8/2017 | Guylaine et al. |
| 9,756,231 | B2 | 9/2017 | Freeman |
| 9,920,511 | B2 | 3/2018 | Goldberg et al. |
| 10,533,312 | B2 | 1/2020 | Gibson et al. |
| 10,535,246 | B2 | 1/2020 | Dunn |
| 10,590,640 | B2 | 3/2020 | Pearce, III et al. |
| 11,505,937 | B2 * | 11/2022 | Mulvaney ............. E03C 1/1222 |
| 2001/0003286 | A1 | 6/2001 | Philippbar et al. |
| 2011/0005615 | A1 | 1/2011 | Savaria |
| 2013/0340836 | A1 | 12/2013 | Wambold |
| 2014/0008296 | A1 | 1/2014 | Mills et al. |
| 2016/0083953 | A1 | 3/2016 | Caux et al. |
| 2018/0051453 | A1 | 2/2018 | Merlo |
| 2018/0094416 | A1 | 4/2018 | Gibson et al. |
| 2018/0347764 | A1 | 12/2018 | Kellar |
| 2020/0355576 | A1 | 11/2020 | Burke et al. |

FOREIGN PATENT DOCUMENTS

| | | |
|---|---|---|
| CN | 105714920 | 12/2017 |
| CN | 208267073 | 12/2018 |
| CN | 109577449 | 4/2019 |
| DE | 20318869 | 12/2003 |
| EP | 2096214 | 5/2015 |
| EP | 3348721 | 5/2020 |
| GB | 2463039 | 7/2012 |
| GB | 2500270 | 8/2016 |
| IN | 202021020572 | 5/2020 |
| KR | 10-1465775 | 12/2014 |
| KR | 10-1937273 | 1/2019 |
| WO | WO 2005095902 | 10/2005 |

OTHER PUBLICATIONS

Drenoyanis et al. "Implementation of an IoT Based Radar Sensor Network for Wastewater Management" Jan. 10, 2019; 31 pps.

Linares et al. "Building a distributed smart system for waste waternetworks" Feb. 2, 2021; 5 pps.

International Search Report for PCT/US22/14457 dated May 5, 2022; 2 pps.

Written Opinion or PCT/US22/14457 dated May 5, 2022; 4 pps.

Office Action for U.S. Appl. No. 17/587,188 dated May 12, 2022; 6 pps.

Notice of Allowance for U.S. Appl. No. 17/587,188 dated Sep. 23, 2022; 7 pps.

\* cited by examiner

SYSTEMS AND METHODS FOR BACKFLOW MANAGEMENT

CROSS-REFERENCE TO RELATED APPLICATIONS

This application claims benefit and priority under 35 U.S.C. § 120 to, and is a Continuation of, International Patent Application No. PCT/US22/14457 filed on Jan. 29, 2022 and titled "SYSTEMS AND METHODS FOR BACKFLOW MANAGEMENT" and which itself claims benefit and priority under 35 U.S.C. § 119 (e) to, and is a Nonprovisional of, U.S. Provisional Patent Application No. 63/143,153 filed on Jan. 29, 2021 and titled "SYSTEMS AND METHODS FOR SEWAGE BLOCKAGE MANAGEMENT", which is hereby incorporated by reference herein in its entirety. This application is also related to U.S. Pat. No. 11,505,937 issued on Nov. 22, 2022.

BACKGROUND

Pressurized fluid conduits are often equipped with backflow prevention devices (e.g., one-way valves) to permit fluid flow in a first direction while preventing flow in the reverse/second direction. Such devices are not installed in non-pressurized (e.g., open channel) conduits as the unpressurized flow is typically not capable of forcing the one-way valve open to permit flow in the first direction. Non-pressurized fluid flow systems are often equipped with reservoirs or holding tanks in which float valves may be placed to regulate the downstream non-pressurized flow. Should a backup occur in such non-pressurized fluid flow systems it may often only be detected by observation of undesirable upstream results such as backflow flooding. In the case that the non-pressurized fluid flow system comprises a sewage or sanitary disposal system, such backflow occurrences can be both costly and time consuming to remediate.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments presented herein are descriptive of systems, apparatus, methods, and articles of manufacture for backflow management. In some embodiments, a backflow management device may be installed in a non-pressurized fluid flow cleanout, for example, and may utilize one or more electronic sensors to monitor the fluid level in the cleanout. In some embodiments, the backflow management device may wirelessly communicate backflow detection events to a networked processing device such as a central controller and/or a user's mobile electronic device. In some embodiments, the networked processing device may be triggered by the event to send an alert, schedule a service appointment, and/or automatically activate a fluid inflow device (e.g., to prevent additional non-pressurized flow from being generated). According to some embodiments, the backflow management device may comprise a housing shaped to replicate and/or replace a four-inch (4") or six-inch (6") diameter Drain, Waste, and Vent (DWC) PolyVinyl Chloride (PVC) cleanout plug Charlotte Pipe and Foundry Company of Charlotte, NC. In such a manner, for example, the backflow management device may be threaded into an existing cleanout in replace of a standard plug and may automatically measure, monitor, and trigger backflow event actions utilizing wireless communications.

Typical non-pressurized/open-channel fluid flow systems such as sewer, sanitary, and drainage systems do not comprise in-conduit measurement devices. Accordingly, such systems are prone to undetected backup events that can cause significant damage to associated buildings and structures. Sewage or drainage backflows can cause flooding inside of structures including inhabited spaces, for example, which may result in necessary evacuation, extensive cleaning/decontamination, and replacement of building materials and/or furnishings.

Embodiments for backflow management systems, methods, and devices presented herein solve these and other deficiencies of non-pressurized fluid flow systems, reducing the likelihood of damage and remedial expense.

II. Backflow Management Systems and Devices

Figure 1:
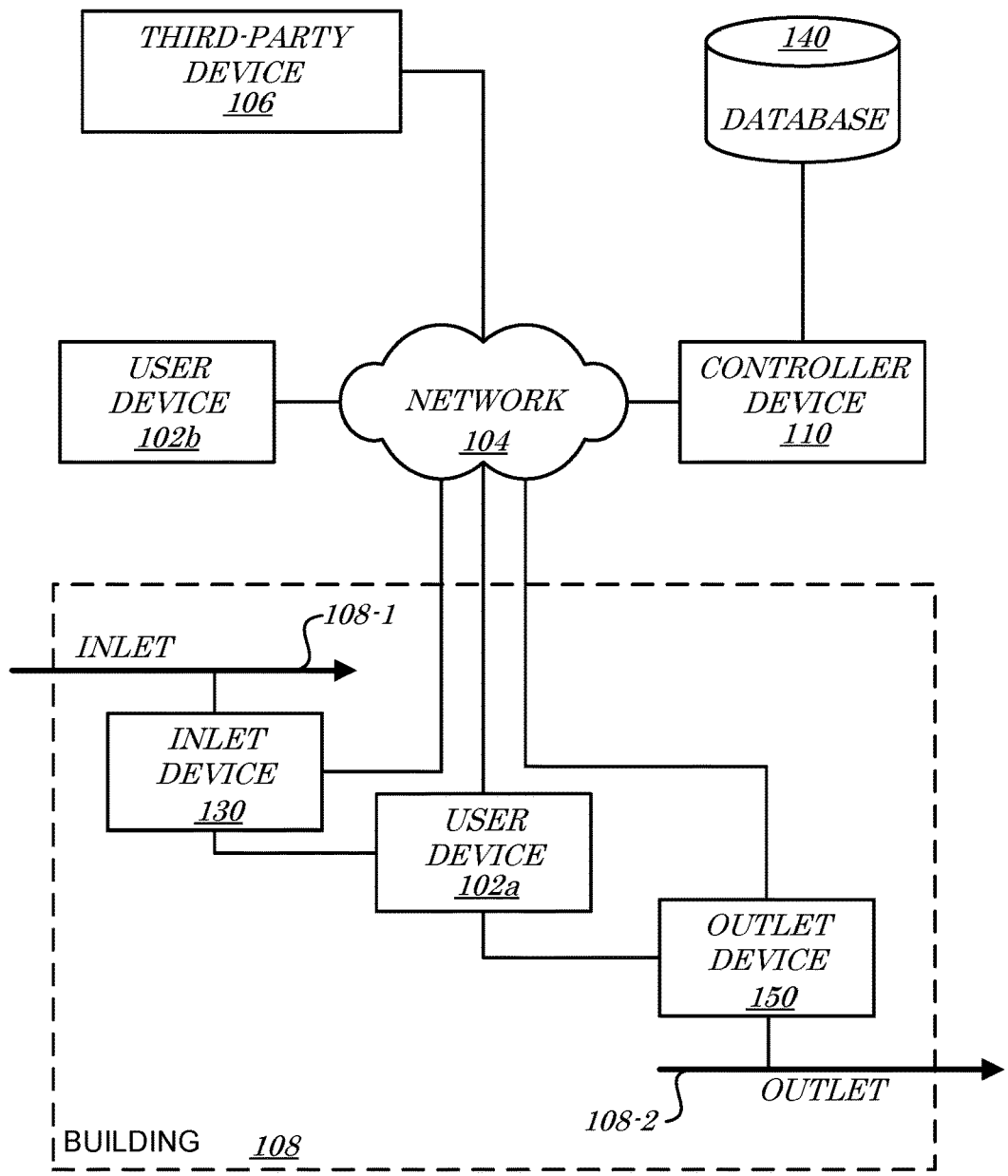
FIG. 1 is a block diagram of a system according to some embodiments.

Turning initially to FIG. 1, a block diagram of a system 100 according to some embodiments is shown. In some embodiments, the system 100 may comprise one or more user devices 102a-b communicatively coupled to a network 104. In some embodiments, the user devices 102a-b and/or the network 104 may also or alternatively be coupled to a third-party device 106 and/or may be disposed in and/or associated with a building 108 (e.g., a first user device 102a may be disposed in the building 108 while a second user device 102b may be disposed outside of and/or remote form the building 108). The building 108 (and/or other type of structure) may comprise and/or define, in some embodiments, a fluid inlet 108-1 and/or a fluid outlet 108-2. The fluid inlet 108-1 may comprise, for example, a water service line, well line, gas inlet, and/or one or more other point and/or non-point sources of fluid. According to some embodiments, the fluid outlet 108-2 may comprise one or more drains and/or other effluent conduits such as a sanitary drain, storm drain, greywater drain, and/or vent. In some embodiments, the user devices 102a-b and/or the third-party device 106 may be in communication with (e.g., via the network 104) one or more of a controller device 110, an inlet device 130, a memory device 140, and/or an outlet device 150 (e.g., a backflow detection and/or management device). According to some embodiments, the outlet device 150 may comprise a sensor such as a pressure transducer, an imaging device, a Light Detection And Ranging (LiDAR) device, and/or an acoustic sensor, that is disposed to capture data descriptive of the outlet 108-2 (e.g., a fluid level and/or presence thereof).

In accordance with some embodiments herein, the user devices 102*a-b* may be utilized to direct, manage, and/or interface with the outlet device 150 to capture pressure readings (and/or other sensor data) of the outlet 108-2 (e.g., within an outlet and/or effluent conduit defined by the outlet 108-2). In some embodiments, the captured readings/data may be provided from the outlet device 150 to one or more of the user devices 102*a-b* (and/or the controller device 110) for readings/sensor data analysis and execution of stored analysis rules and/or logic. In such a manner, for example, data descriptive of the outlet 108-2 may be input into the system 100 and utilized to detect, respond to, and/or otherwise manage backflow events.

Fewer or more components 102*a-b*, 104, 106, 108, 108-1, 108-2, 110, 130, 140, 150 and/or various configurations of the depicted components 102*a-b*, 104, 106, 108, 108-1, 108-2, 110, 130, 140, 150 may be included in the system 100 without deviating from the scope of embodiments described herein. In some embodiments, the components 102*a-b*, 104, 106, 108, 108-1, 108-2, 110, 130, 140, 150 may be similar in configuration and/or functionality to similarly named and/or numbered components as described herein. In some embodiments, the system 100 (and/or portions thereof) may comprise an automatic backflow detection and/or management program, system, and/or platform programmed and/or otherwise configured to execute, conduct, and/or facilitate the method 500 of FIG. 5 herein, and/or portions thereof.

The user devices 102*a-b*, in some embodiments, may comprise any type or configuration of computing, mobile electronic, network, user, and/or communication devices that are or becomes known or practicable. The user devices 102*a-b* may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. In some embodiments, the user devices 102*a-b* may comprise one or more devices owned and/or operated by one or more users, such as a building manager/superintendent, contractor, plumber, home owner, insurance inspector, building inspector, etc. According to some embodiments, the user devices 102*a-b* may communicate with the controller device 110 via the network 104 to provide and/or relay readings and/or other data captured and/or recorded by the outlet device 150 for backflow detection, mitigation, response, cleanup, and/or management, as described herein. According to some embodiments, the user devices 102*a-b* may store and/or execute specially programmed instructions (such as a mobile device application) to operate in accordance with embodiments described herein. The user devices 102*a-b* may, for example, execute one or more mobile device programs that activate and/or control the outlet device 150 and/or that analyze readings and/or other data of the outlet 108-2, e.g., to identify potential backflow events and/or conditions, automatically contact and/or schedule service and/or emergency response services, and/or automatically conduct mitigation efforts such as (but not limited to) closing (and/or otherwise adjusting a setting of) the inlet device 130.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the controller device 110, the user devices 102*a-b*, the third-party device(s) 106, the inlet device 130, the outlet device 150, and/or the memory device 140. In some embodiments, the network 104 may comprise direct communications links between any or all of the components 102*a-b*, 106, 110, 130, 140, 150 of the system 100. The user devices 102*a-b* may, for example, be directly interfaced or connected to one or more of the outlet device 150 and/or the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The outlet device 150 and/or the user devices 102*a-b* may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-b*, 106, 110, 130, 140, 150 of the system 100. The network 104 may comprise one or more cellular telephone networks with communication links between the user devices 102*a-b*, the outlet device 150, and the controller device 110, for example, and/or may comprise a BLE, NFC, RF, and/or "personal" network comprising short-range wireless communications between a first user device 102*a* (e.g., disposed in or proximate to the building 108) and the outlet device 150, for example.

The third-party device 106, in some embodiments, may comprise any type or configuration of a computerized processing device, such as a PC, laptop computer, computer server, database system, and/or other electronic device, devices, or any combination thereof. In some embodiments, the third-party device 106 may be owned and/or operated by a third-party (i.e., an entity different than any entity owning and/or operating any of the user devices 102*a-b*, the building 108, the outlet device 150, and/or the controller device 110). The third-party device 106 may, for example, be owned and/or operated by a data and/or data service provider, such as Dun & Bradstreet® Credibility Corporation (and/or a subsidiary thereof, such as Hoovers™), Deloitte® Development, LLC, Experian™ Information Solutions, Inc., and/or Edmunds.com®, Inc. In some embodiments, the third-party device 106 may supply and/or provide data, such as location data, encryption/decryption data, configuration data, and/or preference data to the controller device 110, the user devices 102*a-b*, and/or the outlet device 150. In some embodiments, the third-party device 106 may comprise a plurality of devices and/or may be associated with a plurality of third-party entities. According to some embodiments, the third-party device 106 may comprise the memory 140 (or a portion thereof), such as in the case the third-party device 106 comprises a third-party data storage service, device, and/or system, such as the Amazon® Simple Storage Service (Amazon® S3™) available from Amazon.com, Inc. of Seattle, WA or an open-source third-party database service, such as MongoDB™ available from MongoDB, Inc. of New York, NY. In some embodiments, the third-party device 106 may comprise a proprietary communication server operable to communicate with and/or control the inlet device 130.

According to some embodiments, the building 108 may comprise any location, object, and/or structure desired for analysis and/or monitoring, such as a location of an insured object, a location of a customer, a location of an account and/or business, etc. In some embodiments, the building 108 may be identified by one or more location parameters, such as an address, postal code, map quadrant, and/or one or more coordinates and/or other identifiers (e.g., a unique geo-referenced location identifier). According to some embodiments, the building 108 may comprise and/or define a fluid system in which fluid is provided to and enters the building 108 via the inlet 108-1 (e.g., and may be controlled, monitored, and/or measured by the inlet device 130), is utilized for some purpose within the building 108 (e.g., potable water, process supply water, natural gas, propane gas, conditioned air, purification and/or cleaning, etc.), and some portion thereof exits the building 108 via the outlet 108-2. The building 108 may comprise a balanced system wherein substantially all fluid entering the building via the inlet 108-1 exits the building via the outlet 108-2 or may comprise an unbalanced system that includes additional fluid source and/or effluents (not shown). According to some embodiments, the inlet 108-1 may comprise a water supply to the building 108 and the outlet 108-2 may comprise a sewer or sanitary drain line exiting the building (e.g., and connecting to a sewer main or septic system, neither of which are separately shown).

In some embodiments, the controller device 110 may comprise an electronic and/or computerized controller device, such as a computer server and/or server cluster communicatively coupled to interface with the user devices 102a-b and/or the outlet device 150 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from one or more of the user devices 102a-b and/or the outlet device 150. The controller device 110 may also or alternatively comprise a plurality of electronic processing devices located at one or more various sites and/or locations (e.g., a distributed computing and/or processing network) inside and/or outside of the building 108.

According to some embodiments, the controller device 110 may store and/or execute specially-programmed instructions to operate in accordance with embodiments described herein. The controller device 110 may, for example, execute one or more programs that facilitate and/or cause the automatic detection, verification, data capture, and/or data analysis of the outlet 108-2 (e.g., via the outlet device 150), as described herein. According to some embodiments, the controller device 110 may comprise a computerized processing device, such as a PC, laptop computer, computer server, and/or other network or electronic device, operated to manage and/or facilitate backflow analysis in accordance with embodiments described herein.

In some embodiments, the inlet device 130 may comprise any type and/or configuration of mechanical, electric, and/or electro-mechanical device that is operable to provide data descriptive of the inlet 108-1 (and/or fluid thereof; not shown). The inlet device 130 may comprise, for example, a meter (and/or a valve) such as a Neptune™ T-10® ¾" Potable Water Meter available from Neptune Technology Group Inc. of Tallassee, AL or a StreamLabs® Smart Home Water Monitor available from Fresh Water Systems of Greenville, NC. According to some embodiments, the inlet device 130 may comprise an actuator and/or automatic valve such as a Belimo® CMB24-L-100D volumetric flow controller and/or a Belimo® EXT-B2050-PWV-NPT+ CQBUP-3 2-way potable water valve, both available from Belimo Aircontrols (USA), Inc. of Danbury, CT. In some embodiments, the inlet device 130 may be controllable via the network 104 and/or by and/or via the user devices 102a-b and/or the third-party device 106.

In some embodiments, the controller device 110, the user devices 102a-b, and/or the outlet device 150 may be in communication with the memory device 140. The memory device 140 may store, for example, mobile device application data, fluid measurement data, user data, damage estimation data, location data (such as coordinates, distances, etc.), security access protocol and/or verification data, service provider contact data, scoring data, qualitative assessment data and/or logic, and/or instructions that cause various devices (e.g., the controller device 110, the user devices 102a-b, and/or the outlet device 150) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store fluid/backflow data, device identifier data, location data, Artificial Intelligence (AI) module(s), image analysis data, and/or damage estimation data provided by (and/or requested by) the user devices 102a-b and/or the third-party device 106, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC), and any various practicable form-factors, such as original, mini, and micro sizes, such as those available from Western Digital Corporation of San Jose, CA). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the user devices 102a-b, the third-party device 106, the controller device 110, the inlet device 130, and/or the outlet device 150 may comprise the memory device 140 or a portion thereof, for example.

The outlet device 150, in some embodiments, may comprise any type or configuration of sensor, device, and/or object that is capable of capturing fluid readings and/or other data descriptive of the building 108 and/or the outlet 108-2 thereof. The outlet device 150 may comprise, for example, one or more pressure transducers such as a ProSense™ MPS25 series mechanical pressure switch, a ProSense™ PSD25 series electronic pressure switch, and/or a ProSense™ EPS Series Digital Pressure Sensor, all available from AutomationDirect.com of Cumming, GA, or a PFT510 Miniature Pressure Sensor (Miniature Flush Mount Diaphragm) available from FUTEK® Advanced Sensor Technology, Inc. of Irvine, CA. The outlet device 150 may, in some embodiments, utilize any fluid sensing technology and/or methodology that is or becomes known or practicable such as, but not limited to, diaphragm displacement, strain gauge-based transduction, LiDAR, acoustic, microwave, Infrared Radiation (IR), capacitance, potentiometric, and/or resonance.

Figure 2:
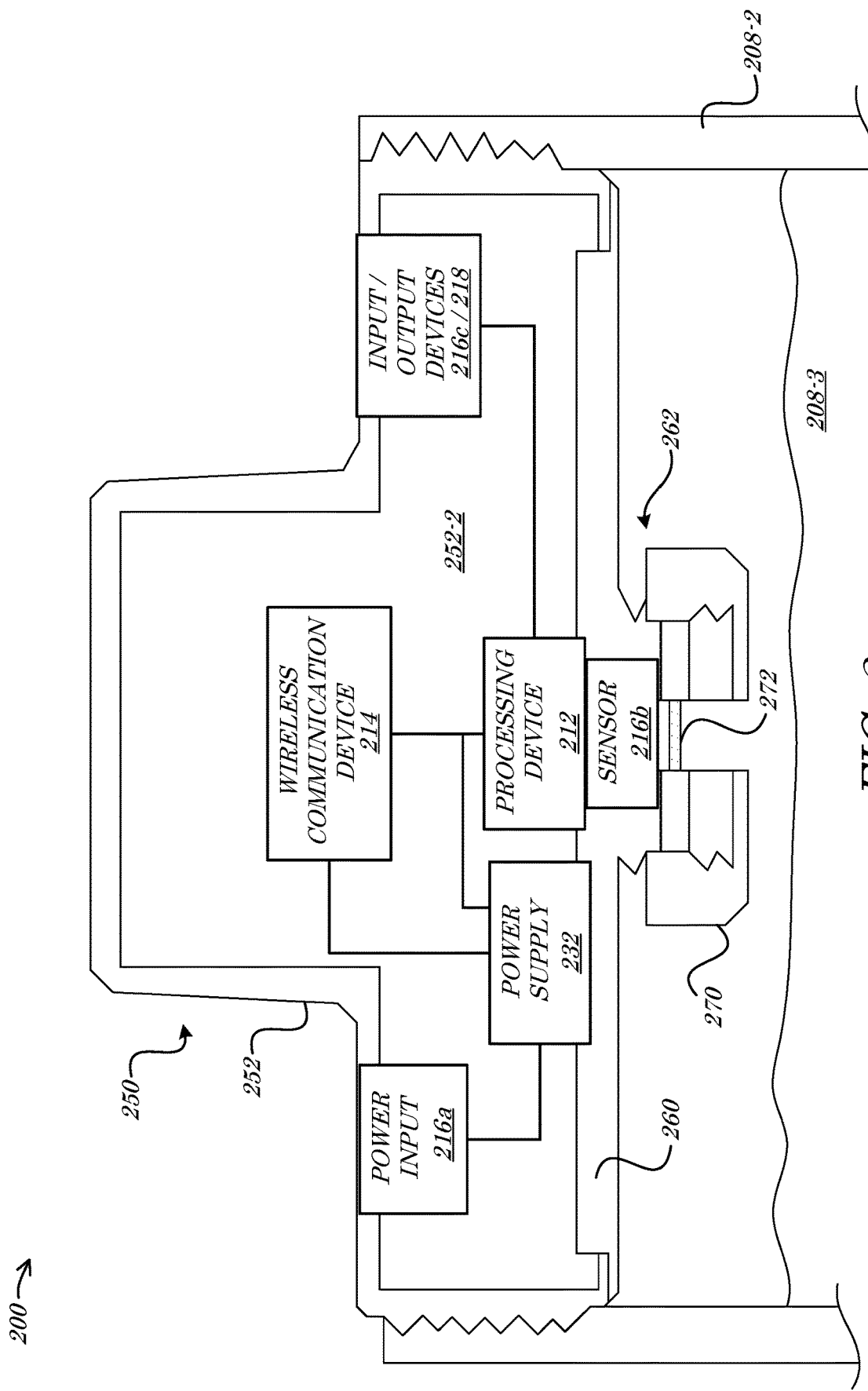
FIG. 2 is a block diagram of a system according to some embodiments.

Referring now to FIG. 2, a block diagram of a system 200 according to some embodiments is shown. The system 200 may comprise, for example, a fluid conduit 208-2 in which a fluid 208-3 is disposed. In some embodiments, such as depicted din FIG. 2 for purposes of non-limiting example, the fluid conduit 208-2 may comprise a riser, end-run, and/or cleanout in fluid communication with an outlet and/or effluent path (not separately shown) such as a sewage or sanitary cleanout of a building (not shown; e.g., the building 108 of FIG. 1). According to some embodiments, the fluid conduit 208-2 may comprise a four-inch (4") or six-inch (6") PVC pipe cleanout and/or cleanout adapter section configured to be selectively sealed and opened with a standard threaded plug (not shown). In some embodiments, the fluid conduit 208-2 may instead be selectively sealed or opened by installation (or removal) of a threaded backflow management device 250.

In some embodiments, the backflow management device 250 may be structurally similar to a standard plug (e.g., circular or cylindrical in shape with threads configured to mate with corresponding threads of the fluid conduit 208-2) but may specially outfitted and/or programmed to detect backflow events and in response to such detections, execute and/or initiate backflow management processes as described herein. The backflow management device 250 may comprise, for example, an electronic processing device 212 coupled to a wireless communication device 214. In some embodiments, the backflow management device 250 may comprise a plurality of input devices 216a-c such as a power input 216a (e.g., a first input, such as a power connection port), a sensor 216b (e.g., a pressure and/or other fluid sensor), and/or a user input device 216c (e.g., a button, switch, etc.). According to some embodiments, the backflow management device 250 may comprise an output device 218 such as a light and/or sounder device to provide user feedback and/or status indications. In some embodiments, the power input 216a may be connected to an internal power supply 232 (such as a battery and/or capacitor) that provides power to any or all of the processing device 212, the wireless communication device 214, the sensor 216b, and/or the output device 218.

According to some embodiments, some or all of the electrical components 212, 214, 216a-c, 218, 232, may be housed within a housing 252 defined by the backflow management device 250. The backflow management device 250 and/or housing 252 thereof may, for example, comprise and/or define an interior volume 252-2 in which the electrical components 212, 214, 216a-c, 218, 232 are disposed. In some embodiments, the housing 252 (and/or the backflow management device 250) may be selectively sealed, opened, and/or closed by installation or removal of a cover 260 that is configured to mate with the housing 252 to seal the interior volume 252-2. In some embodiments, a seal and/or gasket (not shown) may be utilized at the interface between the housing 252 and the cover 260 to prevent (or minimize) the fluid 208-3 from entering the interior volume 252-2.

In some embodiments, the backflow management device 250 and/or the cover 260 thereof may comprise and/or define an exterior projection or port 262 via which the sensor 216b may be exposed to, in communication with, and/or interfaced with the fluid 208-3 (and/or an interior of the fluid conduit 208-2). The sensor 216b may, for example, acquire readings descriptive of the fluid 208-3 such as a distance to a surface of the fluid 208-3, a pressure exerted by the fluid 208-3 (directly or indirectly), a temperature of the fluid 208-3, etc. The backflow management device 250 may, in some embodiments, be programmed to receive, store, and/or analyze these readings to identify a potential backflow event. The backflow management device 250 may be programmed and/or set/configured for different physical installation situations. In the case that the fluid conduit 208-2 comprises a vertical riser cleanout of a sewage or sanitary drain, for example, detection of the fluid 208-3 alone may be indicative of a backflow event and the backflow management device 250 may be programmed to indicate and alert condition and/or backflow event occurrence in response thereto (e.g., by generating output via the output device 218 and/or by transmitting one or more signals via the wireless communication device 214). In the case that the fluid conduit 208-2 comprises a horizontal or Y-junction cleanout (e.g., oriented differently than depicted in FIG. 2), the presence of the fluid 208-3 may not be indicative of a backflow event, but certain qualities of the fluid 208-3 such as depth, distance (e.g., from the sensor 216b), temperature, flow rate, etc., may be indicative of a backflow event and rules for identifying such events may be programmed into the backflow management device 250 to cause output and/or alerts. In some embodiments, a cap 270 may retain a filter, diaphragm, and/or screen 272 covering the port 262, e.g., to prevent fouling and/or damage to the sensor 216b from the fluid 208-3, and/or to provide a mechanism for easy cleaning and/or maintenance thereof.

Fewer or more components 208-2, 208-3, 212, 214, 216a-c, 218, 232, 250, 252, 252-2, 260, 262, 270, 272 and/or various configurations of the depicted components 208-2, 208-3, 212, 214, 216a-c, 218, 232, 250, 252, 252-2, 260, 262, 270, 272 may be included in the system 200 without deviating from the scope of embodiments described herein. In some embodiments, the components 208-2, 208-3, 212, 214, 216a-c, 218, 232, 250, 252, 252-2, 260, 262, 270, 272 may be similar in configuration and/or functionality to similarly named and/or numbered components as described herein. In some embodiments, the system 200 (and/or portions thereof) may comprise an automatic backflow detection and/or management program, system, and/or platform programmed and/or otherwise configured to execute, conduct, and/or facilitate the method 500 of FIG. 5 herein, and/or portions thereof.

Figure 3A:
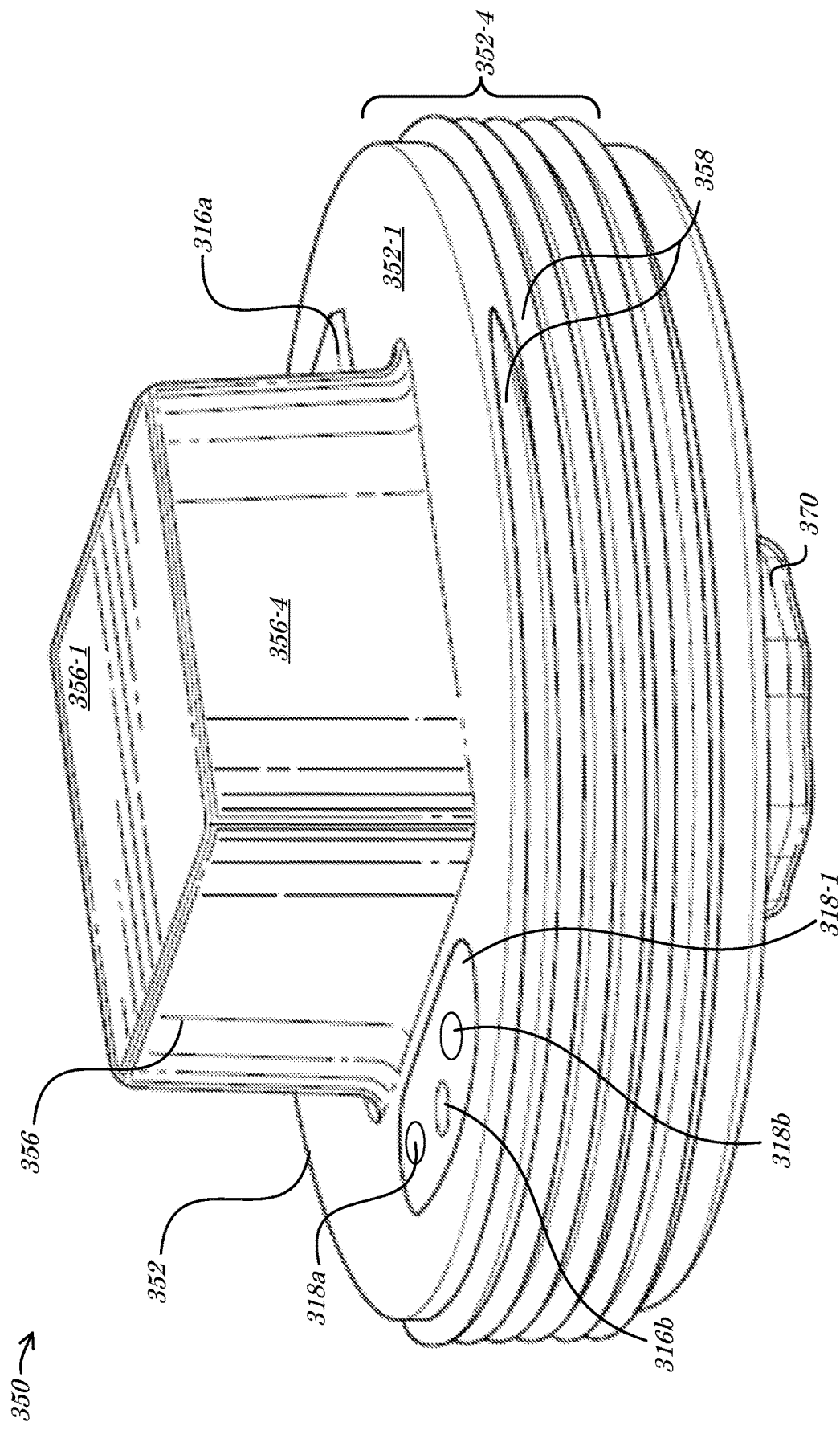
FIG. 3A, FIG. 3B, FIG. 3C, FIG. 3D, FIG. 3E, FIG. 3F, FIG. 3G, FIG. 3H, and FIG. 3I are various views of a backflow management device according to some embodiments.
Figure 3B:
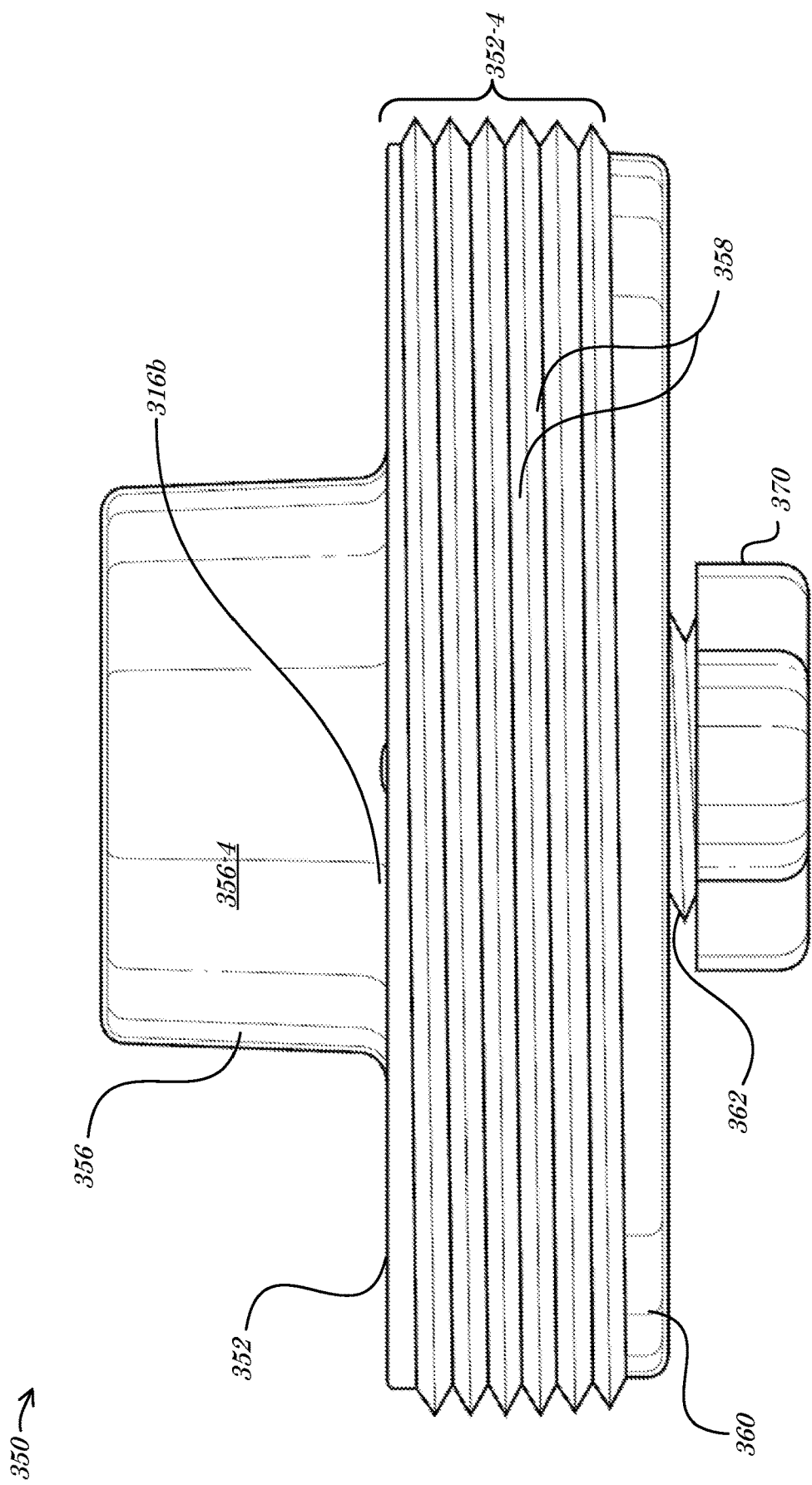
Figure 3C:
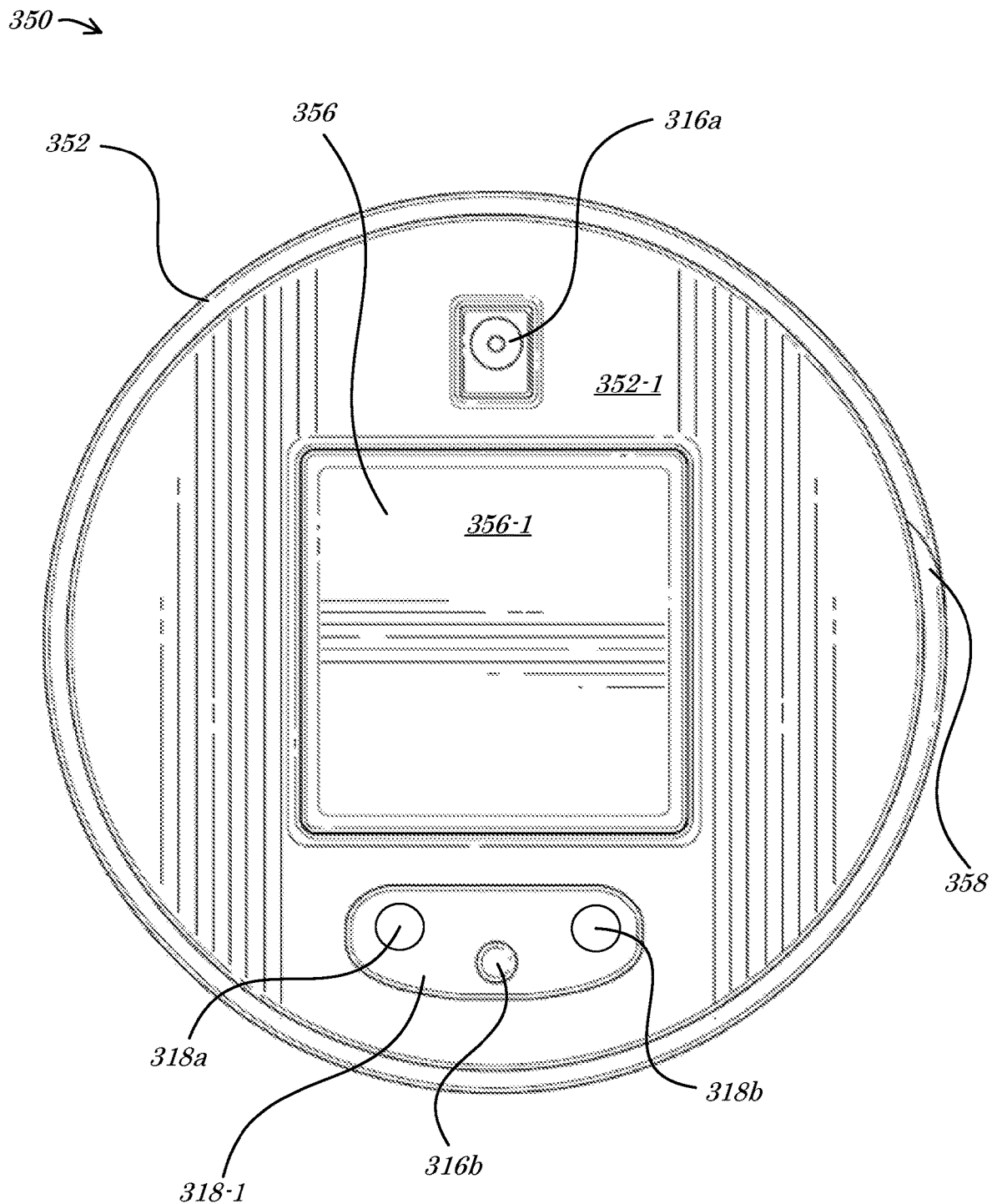
Figure 3D:
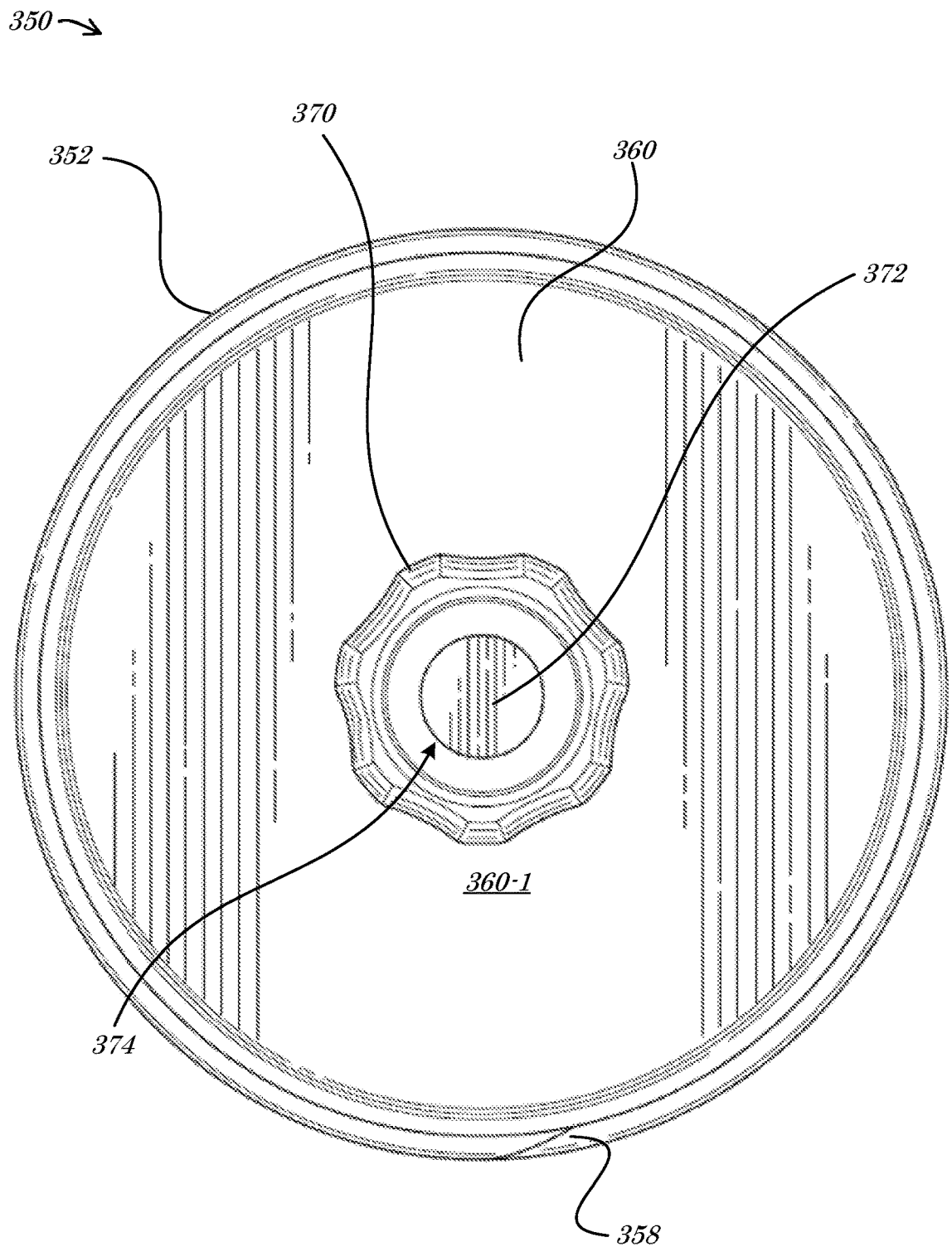
Figure 3E:
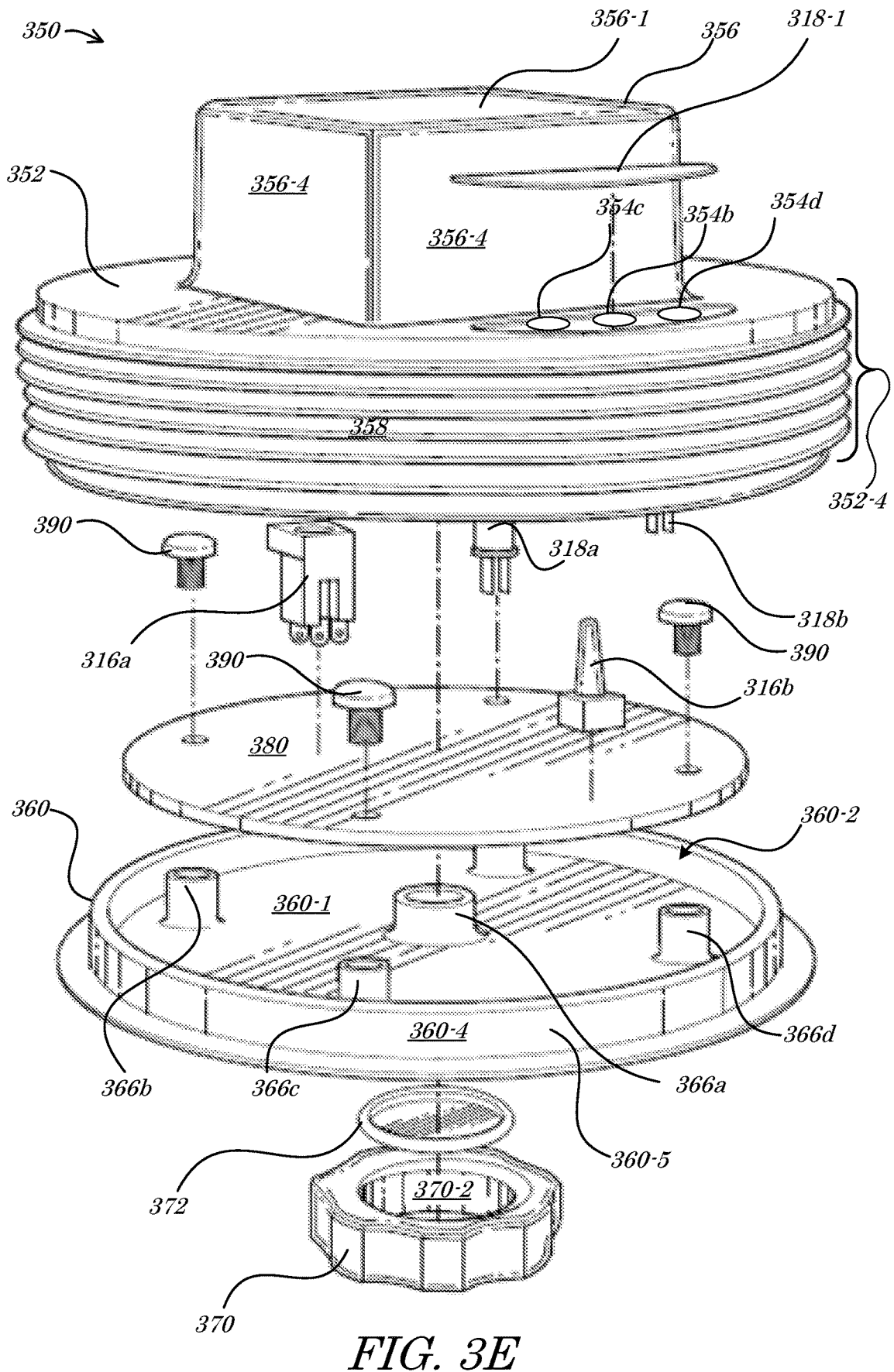
Figure 3F:
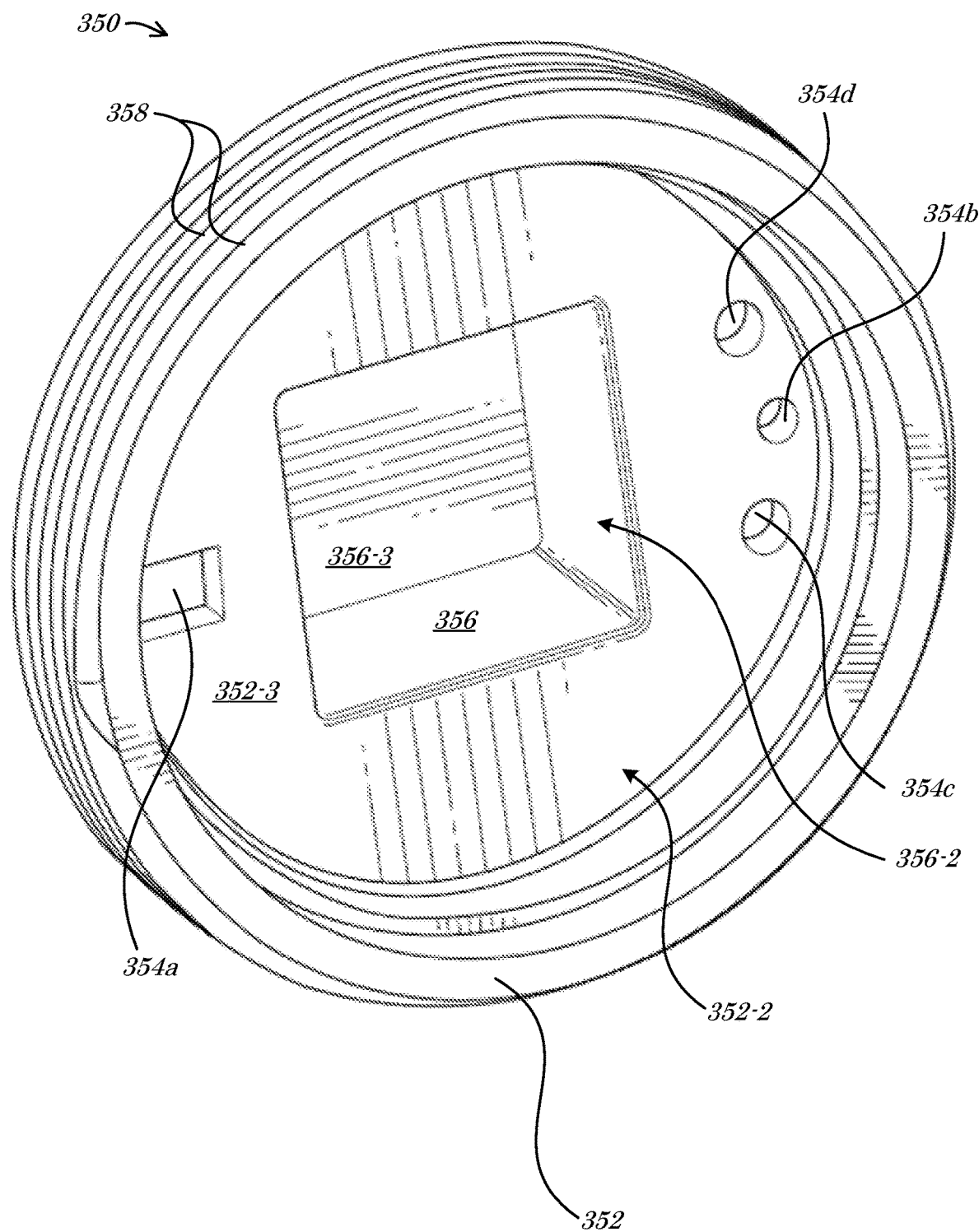

Turning to FIG. 3A, FIG. 3B, FIG. 3C, FIG. 3D, FIG. 3E, FIG. 3F, FIG. 3G, FIG. 3H, and FIG. 3I, various views of a backflow management device 350 according to some embodiments are shown. The backflow management device 350 may comprise, for example, a plurality of input devices 316a-b and/or output devices 318a-b (e.g., secured in place and/or protected via a cover 318-1) coupled to, retained, and/or housed by a housing 352. In some embodiments, the housing 352 may comprise and/or define a top surface 352-1 (that may be circular in shape; FIG. 3A and FIG. 3C) and/or may define an interior volume 352-2 comprising an interior surface 352-3 (FIG. 3F). According to some embodiments, the housing 352 may comprise and/or define one or more sides 352-4 (FIG. 3A, FIG. 3B, and FIG. 3E), which in the case that the backflow management device 350 and/or the housing 352 is cylindrically shaped as depicted, may comprise a single continuous side of the cylinder. In some embodiments, the housing 352 may comprise one or more holes or passages 354a-d that are formed and/or cut between the top surface 352-1 and the interior surface 352-3. As depicted in FIG. 3A, FIG. 3B, and FIG. 3C, the input devices 316a-b and/or output devices 318a-b may be coupled and/or installed to be disposed in or through the passages 354a-d.

According to some embodiments, the backflow management device 350 may comprise and/or define a projection or nub 356 comprising and/or defining a top surface 356-1, a chamber 356-2 comprising an interior surface 356-3, and/or sides 356-4. As depicted, the top surface 356-1 of the nub 356 may be disposed in a plane that is parallel but offset from the top surface 352-1 of the housing 352 and/or the interior surface 356-3 of the nub 356 may be disposed in a plane that is parallel but offset from the interior surface 352-3 of the housing 352. In some embodiments, each of the top surface 352-1, the interior surface 352-3, the top surface 356-1, and the interior surface 356-3 may be disposed in parallel but offset planes. In some embodiments, the sides 356-4 of the nub 356 may be utilized to engage and/or disengage threads 358 on the side(s) 352-4 of the housing 352 with corresponding threads (not shown) in a riser or cleanout pipe and/or pipe adapter, such as by providing torque surfaces that are operable to receive rotational force applied to two or more of the sides 356-4 and transfer the rotational force to the threads 358.

Figure 3G:
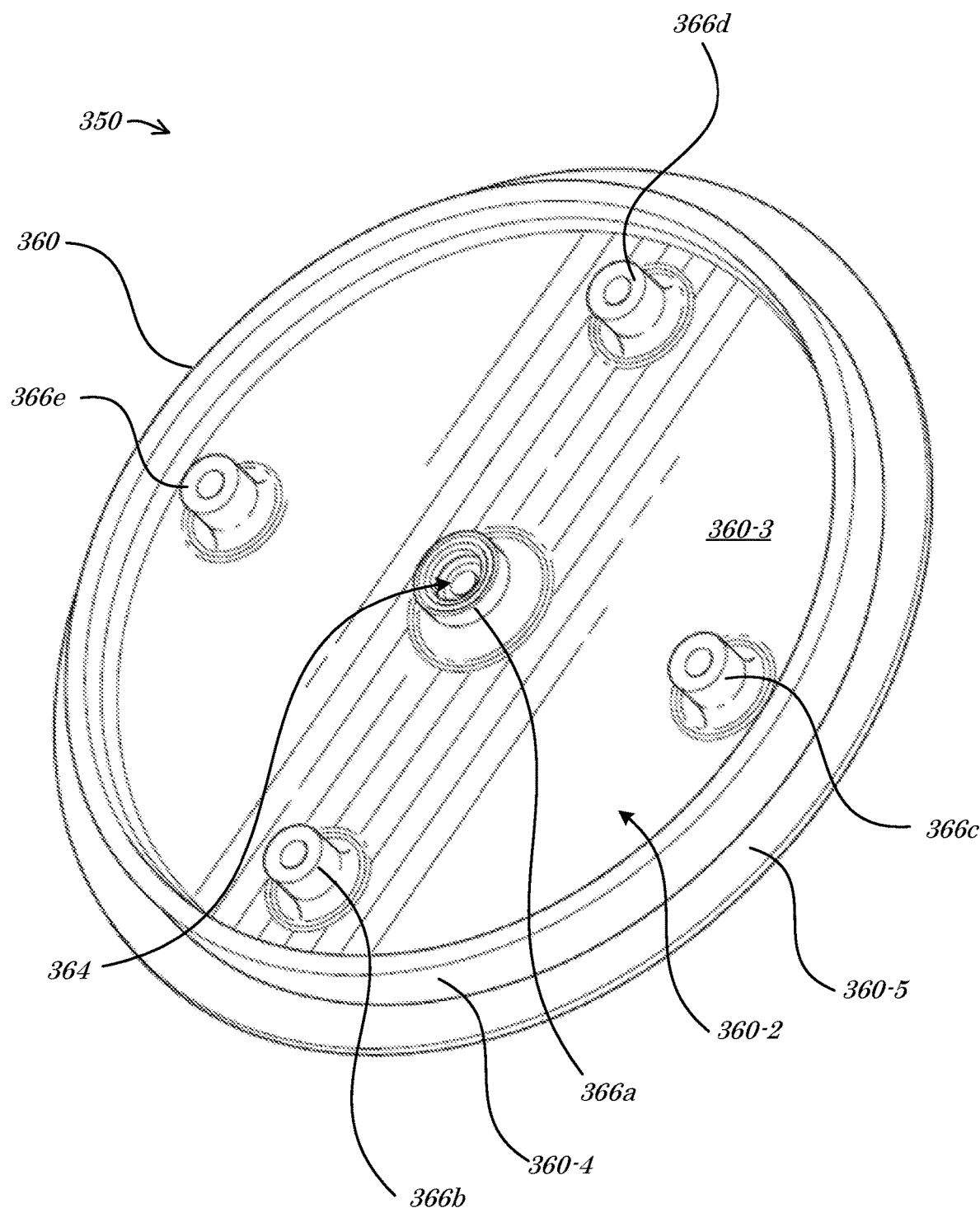
Figure 3H:
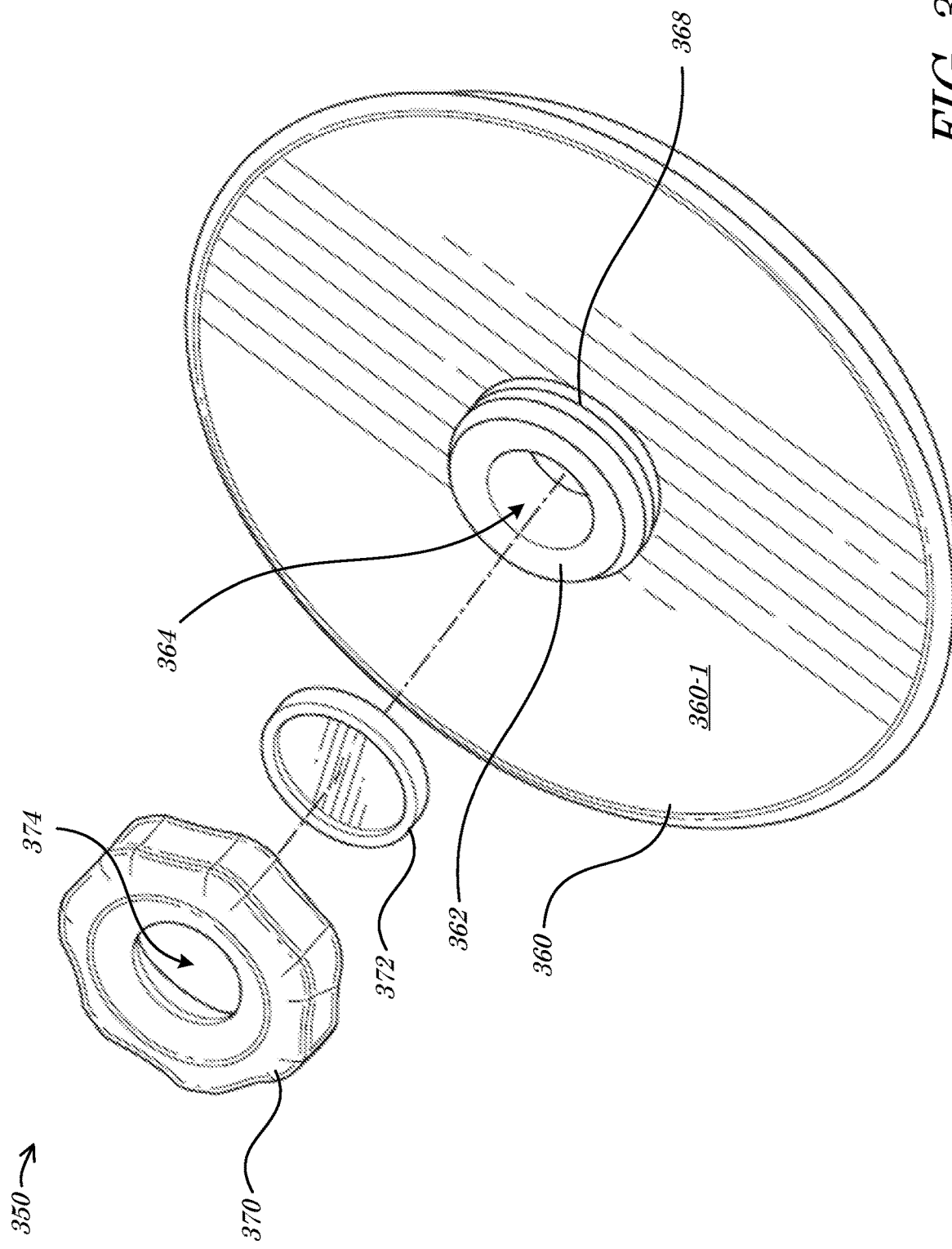

In some embodiments, the housing 352 and/or the interior volume 352-2 thereof may be selectively sealed by coupling and/or mating of a cover 360 thereto. The cover 360 may comprise, for example, an outer surface 360-1 and/or may define an interior volume 360-2 comprising an interior surface 360-3. According to some embodiments, the cover 360 may comprise and/or define one or more sides 360-4 such as the circular wall or axial flange as depicted in FIG. 3E and FIG. 3G. In some embodiments, the side 360-4 may be shaped and/or sized to mate with and/or seat within the interior volume 352-2 of the housing 352. According to some embodiments, the cover 360 may comprise and/or define a flange 360-5 that, e.g., in cooperation with the side 360-4 couples to the housing 352 to seal the interior volume 352-2.

According to some embodiments, the cover 360 (and/or the backflow management device 350) may comprise and/or define an exterior projection 362 comprising a bore 364 that extends through the cover 360. In some embodiments, the cover 360 may comprise and/or define a plurality of mounts 366*a-e* disposed and/or formed on the interior surface 360-3. According to some embodiments, the exterior projection 362 may comprise threads 368 that are configured to mate with and couple to a cap 370. The cap 370 may, for example, define a seat 370-1 in which a screen 372 may be disposed such that in the case that the cap 370 is installed upon the exterior projection 362 the screen 372 is retained to cover the bore 364. In such a manner, for example, the cap 370 may be utilized to selectively install or remove the screen 372 from the bore 364. The cap 370 may, in some embodiments, be annular in shape and/or define a hole 374 that permits the screen 372 and/or the bore 364 to be in communication (e.g., fluid communication) with the environment outside of the backflow management device 350 (e.g., on the side of the cover 360).

In some embodiments, a circuit board 380 such as a Printed Circuit Board (PCB) may be coupled and/or retained in the interior volume 352-2 of the housing 352. As depicted in FIG. 3E, the circuit board 380 may be circular in shape and/or may be sandwiched between the housing 352 and the cover 360. The circuit board 380 may, for example, be mounted to a plurality of the mounts 366*b-e* of the cover 360 utilizing fasteners 390 such as the depicted screws. According to some embodiments, a pressure transducer or other sensor (not shown; e.g., the sensor 216*b* of FIG. 2 herein) may be aligned with and/or mounted into the bore 364 via a first mount 366*a* (e.g., situated in the center of the interior surface 360-3 of the cover 360, as depicted in FIG. 3G). In some embodiments, the input devices 316*a-b* and/or output devices 318*a-b* may be coupled to the circuit board 380 such that they align with respective passages 354*a-d* in the housing 352. According to some embodiments, a first input device 316*a* may comprise a power input, a second input device 316*b* may comprise a button or switch, a first output device 318*a* may comprise a first color light such as a Light Emitting Diode (LED), and/or a second output device 318*b* may comprise a second color light/LED. In some embodiments, other electronic devices (not separately shown) may be coupled to and/or disposed or formed on the circuit board 380 and/or may be in communication with the input devices 316*a-b* and/or the output devices 318*a-b*, e.g., to conduct backflow management processes as described herein.

According to some embodiments, the circuit board 380 may comprise and/or be coupled to a sensor that itself is aligned with and/or coupled to a first mount 366*a* of the cover 360. The screen 372 may protect, shield, and/or filter the sensor from any fluid (not shown) that passes through the hole 374 of the cap 372 and into the bore 364. In such a manner, for example, the sensor may be disposed to acquire data descriptive of the fluid and/or of an environment adjacent to the outer surface 360-1 of the cover 360. The cover 360 may be coupled to the housing 352 to protect the circuit board 380 (e.g., and the sensor) from any exterior fluids. In some embodiments, such as the case in which the threads 358 of the housing 352 are engaged with and/or coupled to or mated to corresponding threads of a fluid conduit (e.g., a non-pressurized and/or open-channel flow conduit; not shown), the environment sensed and/or measured by the sensor may comprise an environment internal to the conduit. According to some embodiments, the backflow management device 350 may identify a backflow (and/or other programmed and/or predefined) event based on the sensor readings/data and may provide indications of the readings/data and/or identification (e.g., an alert) via one or more of the output devices 318*a-b* (and/or via a wireless communication device coupled to and/or integrated with the circuit board 380; not shown). The backflow management device 350 may cause the first output device (e.g., a green LED) to illuminate in the case that no backflow (and/or other alert) event is detected, for example, and/or may cause the second output device (e.g., a red LED) to illuminate in the case that a backflow (and/or other alert) event is detected. In some embodiments, the backflow management device 350 may be powered via the first input device 316*a* (e.g., a Direct Current (DC) power supply connector) and/or may comprise one or more power supplies and/or sources (not shown) integrated with the circuit board 380. According to some embodiments, the second input device 318*b* may comprise a button that permits a user to turn the backflow management device 350 on or off, reset the backflow management device 350, pair the backflow management device 350 with another electronic device (not shown; e.g., via a short-range wireless communications protocol such as Bluetooth®), and/or switch the backflow management device 350 amongst and/or between different modes.

Figure 3I:
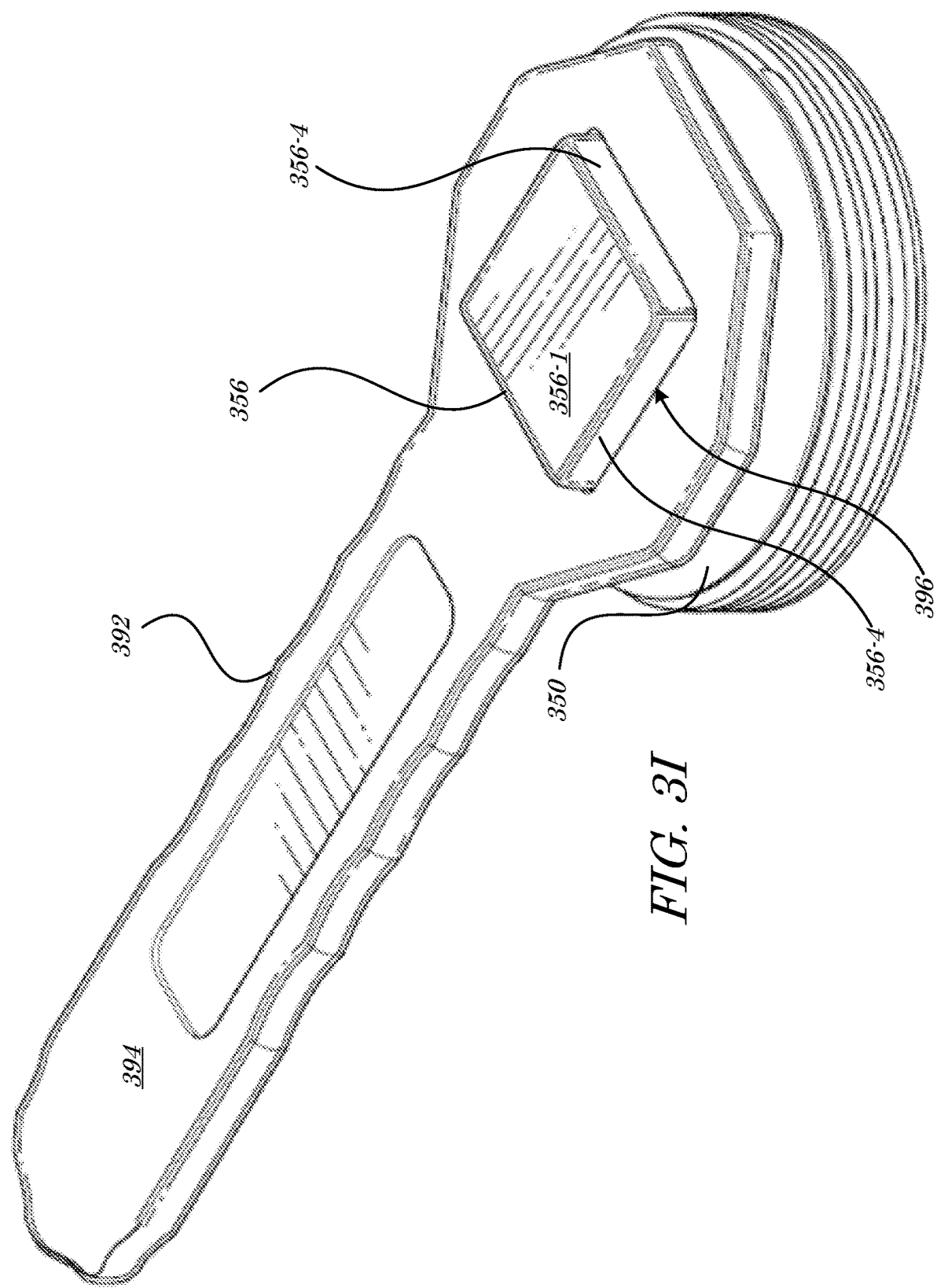

In some embodiments, such as depicted in FIG. 3I, a wrench 392 may be utilized (e.g., coupled and/or mated) to apply rotational forces/torque to the backflow management device 350. The wrench 392 may, for example, comprise a molded, cast, printed, and/or otherwise formed object comprising and/or defining a handle portion 394 that is elongated along an axis and an opening 396 disposed near one end of the wrench 392. According to some embodiments, the opening 396 may be shaped and/or sized to fit over the nub 356 such that the sides 356-4 of the nub 356 engage and/or mate with at least two corresponding sides of the opening 396. Although depicted as a square opening 396 and square nub 356, additional or alternate cooperative geometries may be utilized. In some embodiments, the opening 396 and/or the nub 356 may be sized and/or shaped to prevent rotational engagement in at least one direction. The wrench 392 may only be operable to engage with the backflow management device 350 in a first rotational direction such as to tighten or install the backflow management device 350, for example, or may only be operable to engage with the backflow management device 350 in a second (e.g., reverse) rotational direction such as to loosen or uninstall the backflow management device 350. In such embodiments, a first version of the wrench 392 may be provided for tightening/installation and a second version (not shown) of the wrench 392 may be provided for loosening/uninstallation.

While various sizes, quantities, dimensions, and/or proportions of various elements and/or features of the backflow management device 350 are described and/or depicted, in some embodiments, different sizes, quantities, dimensions, and/or proportions of the various elements may be utilized. Similarly, mating and/or other cooperative and/or corresponding elements may be reversed in some embodiments.

Fewer or more components 316a-b, 318a-b, 318-1, 352, 352-1, 352-2, 352-3, 352-4, 354a-d, 356, 356-1, 356-2, 356-3, 356-4, 358, 360, 360-1, 360-2, 360-3, 360-4, 360-5, 362, 364, 366a-e, 368, 370, 370-2, 372, 374, 380, 390, 392, 394, 396 and/or various configurations of the depicted components 316a-b, 318a-b, 318-1, 352, 352-1, 352-2, 352-3, 352-4, 354a-d, 356, 356-1, 356-2, 356-3, 356-4, 358, 360, 360-1, 360-2, 360-3, 360-4, 360-5, 362, 364, 366a-e, 368, 370, 370-2, 372, 374, 380, 390, 392, 394, 396 may be included in the backflow management device 350 without deviating from the scope of embodiments described herein. In some embodiments, the components 316a-b, 318a-b, 318-1, 352, 352-1, 352-2, 352-3, 352-4, 354a-d, 356, 356-1, 356-2, 356-3, 356-4, 358, 360, 360-1, 360-2, 360-3, 360-4, 360-5, 362, 364, 366a-e, 368, 370, 370-2, 372, 374, 380, 390, 392, 394, 396 may be similar in configuration and/or functionality to similarly named and/or numbered components as described herein. In some embodiments, the backflow management device 350 (and/or portions thereof) may comprise an automatic backflow detection and/or management program, system, and/or platform programmed and/or otherwise configured to execute, conduct, and/or facilitate the method 500 of FIG. 5 herein, and/or portions thereof.

Figure 4:
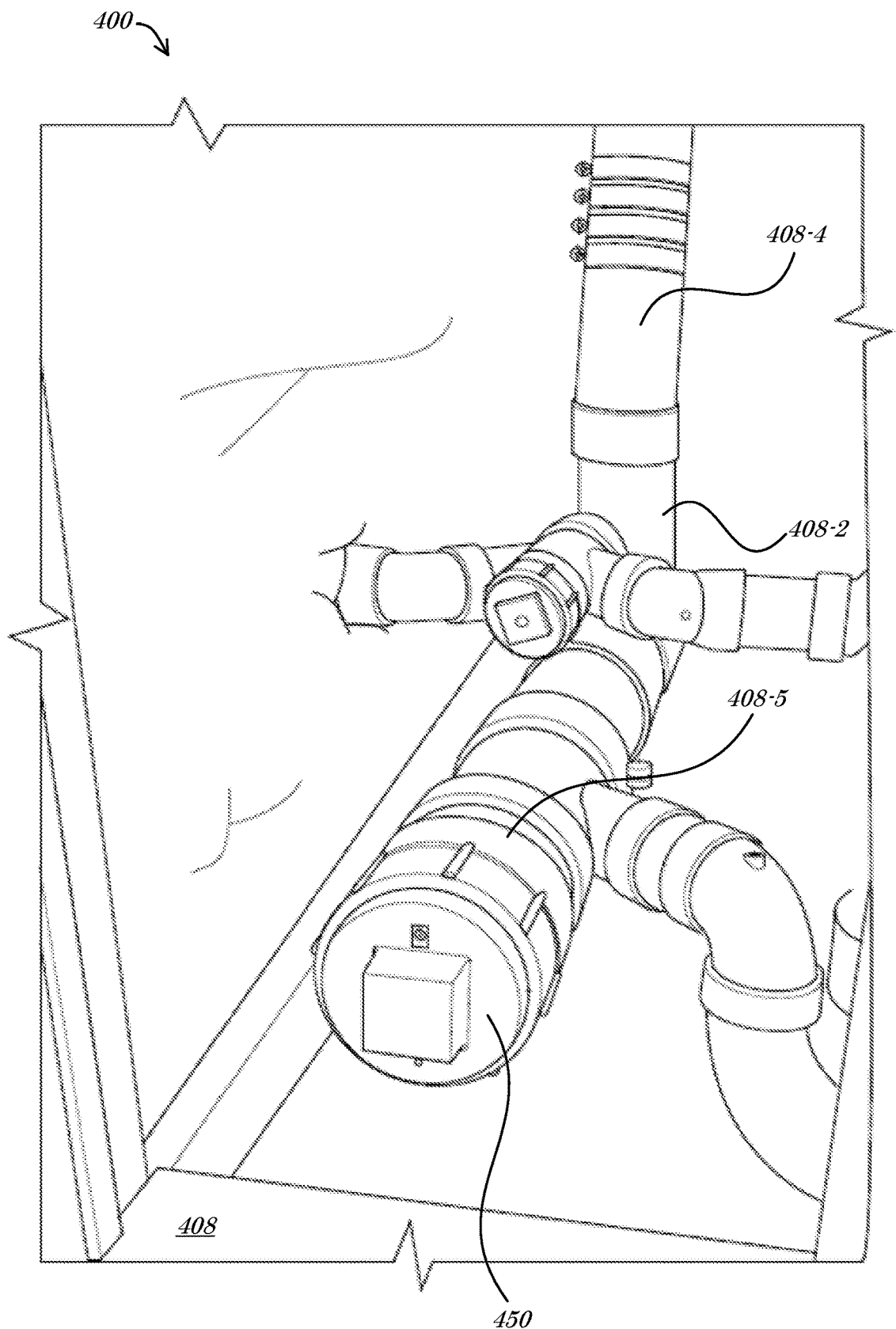
FIG. 4 is a perspective diagram of a system according to some embodiments.

Referring now to FIG. 4, a perspective diagram of a system 400 according to some embodiments is shown. In some embodiments, the system 400 may comprise an indoor sanitary, sewer, and/or other drain system of a building 408 (and/or other structure). The system 400 may comprise, for example, an outlet 408-2 coupled to a drain pipe 408-4. According to some embodiments, the outlet 408-2 and/or the drain pipe 408-4 may be coupled to and/or in fluid communication with a cleanout 408-5. The cleanout 408-5 may comprise, as depicted for non-limiting example, a horizontal offshoot that is terminated with an installed backflow management device 450. Cleanouts 408-5 may be oriented in different manners (e.g., angled) and/or may comprise different configurations than the cleanout 408-5 depicted in FIG. 4. In some embodiments, the installed backflow management device 450 may comprise a threaded plug (e.g., a "smart" plug) that seals and/or closes the cleanout 408-5. In such a manner, for example, the installed backflow management device 450 may be coupled to detect, measure, identify, analyze, and/or generate alerts based on fluid characteristics within the cleanout 408-5. In standard non-pressurized drainage setups, for example, no liquid (e.g., wastewater, sewage, etc.) should be detectable within the cleanout 408-5 and/or the presence of any liquid/solids should be transitory in nature (e.g., a splash-back from a point load drainage event). The installed backflow management device 450 may analyze sensor readings descriptive of the inside of the cleanout 408-5 to automatically determine whether a backflow event is likely to exist. In the case that such an event is identified, remedial action (e.g., alerts, automatic scheduling, and/or automatic shutoffs) may be initiated by the installed backflow management device 450, in accordance with embodiments described herein.

Fewer or more components 408, 408-2, 408-4, 408-5, 450 and/or various configurations of the depicted components 408, 408-2, 408-4, 408-5, 450 may be included in the system 400 without deviating from the scope of embodiments described herein. In some embodiments, the components 408, 408-2, 408-4, 408-5, 450 may be similar in configuration and/or functionality to similarly named and/or numbered components as described herein. In some embodiments, the system 400 (and/or portions thereof) may comprise an automatic backflow detection and/or management program, system, and/or platform programmed and/or otherwise configured to execute, conduct, and/or facilitate the method 500 of FIG. 5 herein, and/or portions thereof.

III. Backflow Management Methods

Figure 5:
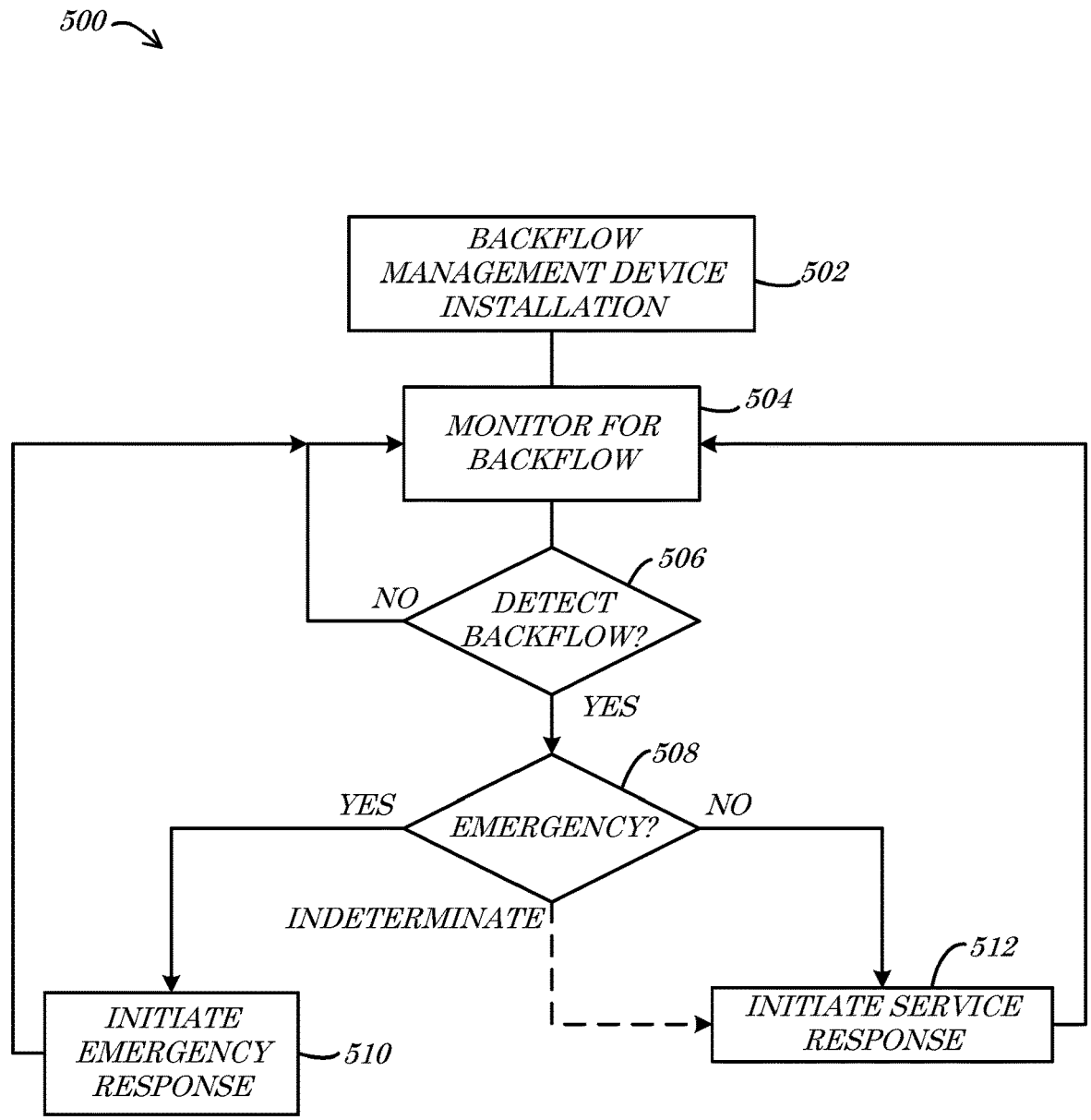
FIG. 5 is a flow diagram of a method according to some embodiments.

Referring now to FIG. 5, a flow diagram of a method 500 according to some embodiments is shown. In some embodiments, the method 500 may be performed and/or implemented by and/or otherwise associated with one or more specialized and/or specially-programmed computers (e.g., one or more of the user devices 102a-b, third-party devices 106, the controller devices 110, and/or the apparatus 610 of FIG. 1 and/or FIG. 6 herein), computer terminals, computer servers, computer systems and/or networks, and/or any combinations thereof (e.g., by one or more backflow management devices as described herein). In some embodiments, the method 500 may be embodied in, facilitated by, and/or otherwise associated with various input mechanisms and/or interfaces (such as the interface 620 of FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 640 of FIG. 1 and/or FIG. 6 herein) may store thereon instructions that when executed by a machine (such as a computerized processor) result in performance according to any one or more of the embodiments described herein.

According to some embodiments, the method 500 may comprise backflow management device installation, at 502.

One or more backflow management devices may, for example, be threaded into (or onto) and/or otherwise coupled to a non-pressurized and/or open-channel flow conduit such as a sanitary, storm, and/or sewer drain of a structure (e.g., an outlet). In some embodiments, the backflow management device may be installed utilizing a specialized wrench as described herein. The backflow management device may be installed by a homeowner, a landlord, a superintendent, a plumber, and/or another service technician and/or user. According to some embodiments, the backflow management device may comprise one or more sensors, input devices, output devices, power devices, and/or communications devices.

In some embodiments, the method 500 may comprise monitoring (e.g., by an electronic processing device and/or sensor/imaging device) for backflow, at 504. One or more sensors, such as pressure transducers, cameras, data transceivers, range finding devices, and/or other imagery and/or data acquisition devices, may, for example, be utilized to capture data descriptive of fluid flow at and/or in the outlet. In some embodiments, data readings and/or values may be captured and/or acquired automatically at pre-defined intervals (e.g., every second, minute, hour). According to some embodiments, the data may comprise any quantity, type, and/or configuration of data that is or becomes known or practicable. The data may include, for example, a plurality of readings and/or values descriptive of fluid characteristics such as pressure, flow rate, temperature, distance to surface, turbidity, etc.

According to some embodiments, the method 500 may comprise determining (e.g., by the electronic processing device) whether backflow is detected, at 506. Any or all data measured and/or acquired by the sensor(s) may be processed by the backflow management device (and/or a device in communication therewith), for example, to identify that the data matches a pre-programmed backflow event condition. The data may be compared to one or more thresholds and/or models, for example, to identify that a condition sensed by the sensor is likely to be indicative of a backflow event. In the case that no backflow event is identified, the method 500 may proceed back to continue monitoring for backflow at 504. In the case that a backflow event is identified, the method 500 may continue to determine whether the backflow event constitutes an emergency condition, at 508

The method 500 may comprise, for example, determining (e.g., by the electronic processing device) whether the backflow event is an emergency event, at 508. Stored rules and/or logic (e.g., AI logic) may be utilized, for example, to compare attributes of the backflow event to one or more thresholds and/or criteria to identify whether the event should be characterized as an emergency event. In some embodiments, emergency event identification parameters may be customized for each installation location, set and/or edited by a user, and/or may be automatically updated via wireless communication (e.g., from a remote controller/server). In the case that it is determined that an emergency event has occurred (e.g., the backflow event is significant enough to constitute an emergency), the method 500 may proceed to initiate an emergency response, at 510. The emergency response may comprise, for example, an automatic alert and/or notification to pre-designated emergency response service personnel such as a twenty-four hour (24-hr) emergency plumbing service, a cleanup/repair company, and/or emergency response personnel (e.g., for potentially unsafe condition remediation).

In the case that it is determined that an emergency event has not occurred (e.g., the backflow event is not significant enough to constitute an emergency), the method 500 may proceed to initiate a service response, at 512. According to some embodiments, a set of thresholds and/or criteria defining an emergency classification for backflow events may permit analysis of the rules to result in an indeterminate conclusion/characterization. In such cases, and in the case that an intermediate characterization of the backflow event is identified and/or computed, the method 500 may proceed to initiate a service response, at 512, or may alternatively be configured to implement a more fail-safe approach in which the indeterminate event characterization causes the method 500 to proceed to initiate the emergency response, at 510.

According to some embodiments, the method 500 may proceed back to continue monitoring for backflow at 504 once either the emergency response initiation at 510 or the service response initiation at 512 have been triggered and/or completed. In some embodiments, the method 500 may also or alternatively store and/or transmit sensed data after an identification/detection of a backflow event, such as to better document and/or inform regarding the identified condition.

IV. Backflow Management Apparatus

Figure 6:
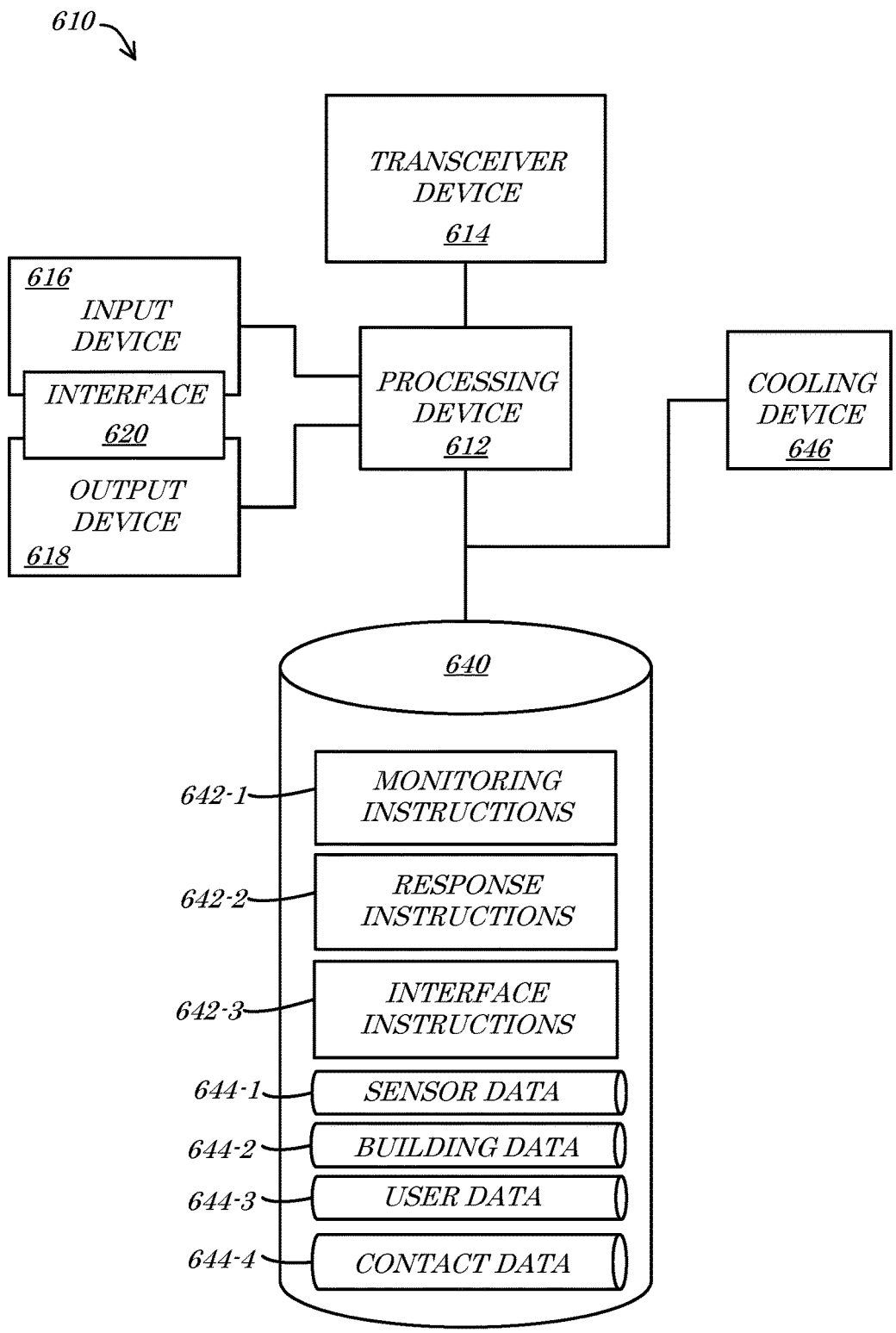
FIG. 6 is a block diagram of an apparatus according to some embodiments.

Referring now to FIG. 6, a block diagram of an apparatus 610 according to some embodiments is shown. In some embodiments, the apparatus 610 may be similar in configuration and/or functionality to any of the user devices 102a-b, the third-party devices 106, the controller device 110, and/or the outlet/backflow management devices 150, 250, 350, 450 of FIG. 1, FIG. 2, FIG. 3A, FIG. 3B, FIG. 3C, FIG. 3D, FIG. 3E, FIG. 3F, FIG. 3G, FIG. 3H, FIG. 3I and/or FIG. 4 herein. The apparatus 610 may, for example, execute, process, facilitate, and/or otherwise be associated with the method/process 500 of FIG. 5 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 646. According to some embodiments, any or all of the components 612, 614, 616, 618, 620, 640, 642, 644, 646 of the apparatus 610 may be similar in configuration and/or functionality to any similarly named and/or numbered components described herein. Fewer or more components 612, 614, 616, 618, 620, 640, 642, 644, 646 and/or various configurations of the components 612, 614, 616, 618, 620, 640, 642, 644, 646 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E6501 chipset. In some embodiments, the processor 612 may comprise multiple interconnected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 may be communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., a user, such as to initiate automatic backflow condition monitoring and/or management, as described herein). The output device 618 may, according to some embodiments, comprise a display screen and/or other practicable output component and/or device. The output device 618 may, for example, provide an interface (such as the interface 620) via which backflow modeling, assessment, and/or analysis data or information is provided to a user (e.g., via a website and/or mobile application). According to some embodiments, the input device 616 and/or the output device 618 may comprise and/or be embodied in a single device, such as a touch-screen monitor or display.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of monitoring instructions 642-1, response instructions 642-2, and/or interface instructions 642-3, sensor data 644-1, building data 644-2, user data 644-3, and/or contact data 644-4. In some embodiments, the monitoring instructions 642-1, response instructions 642-2, and/or interface instructions 642-3, sensor data 644-1, building data 644-2, user data 644-3, and/or contact data 644-4 may be utilized by the processor 612 to provide output information via the output device 618 and/or the transceiver device 614.

According to some embodiments, the monitoring instructions 642-1 may be operable to cause the processor 612 to process sensor data 644-1, building data 644-2, user data 644-3, and/or contact data 644-4 in accordance with embodiments as described herein. Sensor data 644-1, building data 644-2, user data 644-3, and/or contact data 644-4 received via the input device 616 and/or the transceiver device 614 may, for example, be analyzed, sorted, filtered, decoded, decompressed, ranked, scored, plotted, and/or otherwise processed by the processor 612 in accordance with the monitoring instructions 642-1. In some embodiments, sensor data 644-1, building data 644-2, user data 644-3, and/or contact data 644-4 may be fed by the processor 612 through one or more mathematical and/or statistical formulas and/or models in accordance with the monitoring instructions 642-1 to acquire and/or direct the acquisition of sensor data descriptive of an outlet conduit and/or fluid conditions thereof, as described herein.

In some embodiments, the response instructions 642-2 may be operable to cause the processor 612 to process sensor data 644-1, building data 644-2, user data 644-3, and/or contact data 644-4 in accordance with embodiments as described herein. Sensor data 644-1, building data 644-2, user data 644-3, and/or contact data 644-4 received via the input device 616 and/or the transceiver device 614 may, for example, be analyzed, sorted, filtered, decoded, decompressed, ranked, scored, plotted, and/or otherwise processed by the processor 612 in accordance with the response instructions 642-2. In some embodiments, sensor data 644-1, building data 644-2, user data 644-3, and/or contact data 644-4 may be fed by the processor 612 through one or more mathematical and/or statistical formulas and/or models in accordance with the response instructions 642-2 to identify contact information for a service and/or response technician and automatically transmit an alert or request thereto, as described herein.

According to some embodiments, the interface instructions 642-3 may be operable to cause the processor 612 to process sensor data 644-1, building data 644-2, user data 644-3, and/or contact data 644-4 in accordance with embodiments as described herein. Sensor data 644-1, building data 644-2, user data 644-3, and/or contact data 644-4 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-3. In some embodiments, sensor data 644-1, building data 644-2, user data 644-3, and/or contact data 644-4 may be fed by the processor 612 through one or more mathematical and/or statistical formulas and/or models in accordance with the interface instructions 642-3 to provide various interfaces to end-users, consumers, companies, and/or other users to facilitate backflow management, as described herein.

In some embodiments, the apparatus 610 may comprise the cooling device 646. According to some embodiments, the cooling device 646 may be coupled (physically, thermally, and/or electrically) to the processor 612 and/or to the memory device 640. The cooling device 646 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required. Although a product may be described as including a plurality of components, aspects, qualities, characteristics and/or features, that does not indicate that all of the plurality are essential or required. Various other embodiments within the scope of the described invention(s) include other products that omit some or all of the described plurality. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise. Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A reference to "another embodiment" in describing an embodiment does not imply that the referenced embodiment is mutually exclusive with another embodiment (e.g., an embodiment described before the referenced embodiment), unless expressly specified otherwise.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including ten percent (10%) of that value are intended, unless explicitly stated otherwise.

Directions and other relative references may be used to facilitate discussion of the drawings and principles herein, but are not intended to be limiting. For example, certain terms may be used such as "inner," "outer", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. Similarly, while the terms "horizontal" and "vertical" may be utilized herein, such terms may refer to any normal geometric planes regardless of their orientation with respect to true horizontal or vertical directions (e.g., with respect to the vector of gravitational acceleration).

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

"Determining" something can be performed in a variety of manners and therefore the term "determining" (and like terms) includes calculating, computing, deriving, looking up (e.g., in a table, database or data structure), ascertaining and the like The terms "including", "comprising" and variations thereof mean "including but not limited to", unless expressly specified otherwise. As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Various modifications of the invention and many further embodiments thereof, in addition to those shown and described herein, will become apparent to those skilled in the art from the full contents of this document, including references to any scientific and patent literature cited herein. The subject matter herein contains important information, exemplification and guidance that can be adapted to the practice of this invention in its various embodiments and equivalents thereof. It will be understood that various modifications can be made to the embodiments of the present disclosure herein without departing from the scope thereof. Therefore, the above description should not be construed as limiting the disclosure, but merely as embodiments thereof.

Those skilled in the art will envision other modifications within the scope of the invention as defined by the claims appended hereto.

What is claimed is:

1. An automatic backflow management system, comprising:
    a backflow management device comprising:
        a housing comprising threads and defining an interior volume, the threads being engaged with corresponding threads of a non-pressurized fluid conduit;
        a cover coupled to seal the interior volume, the cover comprising a bore; and
        an electronic processing device disposed within the interior volume;
    a fluid sensor disposed within the interior volume, in communication with the electronic processing device, and oriented to detect fluid properties through the bore;
    a wireless communication device disposed within the interior volume and in communication with the electronic processing device; and
    a memory device storing instructions that when executed by the electronic processing device result in:
        receiving data descriptive of a fluid property of a fluid in the non-pressurized fluid conduit;
        identifying, by the electronic processing device and by a comparison of the data to stored rules, an occurrence of a backflow event; and
        automatically transmitting, by the wireless communication device, an alert descriptive of the identified backflow event occurrence.

2. The automatic backflow management system of claim 1, wherein the instructions, when executed, further result in:
    automatically transmitting, by the wireless communication device and in response to the identifying of the backflow event, a shutoff command to a fluid inlet device.

3. The automatic backflow management system of claim 1, further comprising:
    the fluid inlet device.

4. The automatic backflow management system of claim 1, wherein the housing further comprises a raised nub defining a plurality of sides extending axially from the housing.

5. The automatic backflow management system of claim 1, wherein the non-pressurized fluid conduit comprises a section of at least one of a sanitary and a sewer effluent system.

6. The automatic backflow management system of claim 1, wherein the fluid comprises sewage.

7. The automatic backflow management system of claim 1, wherein the fluid property of the fluid comprises a distance of a surface of the fluid from the fluid sensor.

8. The automatic backflow management system of claim 1, wherein the fluid property of the fluid comprises a pressure exerted by the fluid.

9. The automatic backflow management system of claim 8, wherein the fluid property of the fluid comprises a measurement of an amount of the pressure exerted by the fluid.

10. An automatic backflow management method, comprising:
    receiving, (i) by an electronic processing device disposed within an interior volume of a housing of a backflow management device, the housing of the backflow management device comprising exterior threads that are engaged to couple the housing of the backflow management device with corresponding threads of a non-pressurized fluid conduit, and the backflow management device comprising a cover coupled to seal the interior volume, and wherein the cover comprises a bore, and (ii) from a fluid sensor disposed within the interior volume, the fluid sensor being in in communication with the electronic processing device and being oriented to detect fluid properties through the bore, (iii) data descriptive of a fluid property of a fluid in the non-pressurized fluid conduit;

identifying, by an execution of instructions by the electronic processing device, the instructions being stored on a memory device disposed within the interior volume and in communication with the electronic processing device, and by a comparison of the data to stored rules, an occurrence of a backflow event; and automatically transmitting, by a wireless communication device disposed within the interior volume and in communication with the electronic processing device, an alert descriptive of the identified backflow event occurrence.

11. The automatic backflow management method of claim 10, further comprising:

automatically transmitting, by the wireless communication device and in response to the identifying of the backflow event, a shutoff command to a fluid inlet device.

12. The automatic backflow management method of claim 11, wherein the fluid inlet device comprises a valve that controls a pressurized fluid distribution system.

13. The automatic backflow management method of claim 10, wherein the housing further comprises a raised nub defining a plurality of sides extending axially from the housing.

14. The automatic backflow management method of claim 10, wherein the non-pressurized fluid conduit comprises a section of at least one of a sanitary and a sewer effluent system.

15. The automatic backflow management method of claim 10, wherein the fluid comprises sewage.

16. The automatic backflow management method of claim 10, wherein the fluid property of the fluid comprises a distance of a surface of the fluid from the fluid sensor.

17. The automatic backflow management method of claim 10, wherein the fluid property of the fluid comprises a pressure exerted by the fluid.

18. The automatic backflow management system of claim 17, wherein the fluid property of the fluid comprises a measurement of an amount of the pressure exerted by the fluid.

* * * * *